US010942979B2

(12) United States Patent
Hewitt et al.

(10) Patent No.: US 10,942,979 B2
(45) Date of Patent: Mar. 9, 2021

(54) COLLABORATIVE CREATION OF CONTENT SNIPPETS

(71) Applicant: INTERNATIONAL BUSINESS MACHINES CORPORATION, Armonk, NY (US)

(72) Inventors: Trudy L. Hewitt, Cary, NC (US); Jeremy R. Fox, Georgetown, TX (US); John Rice, Joondalup (AU); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 202 days.

(21) Appl. No.: 16/116,195

(22) Filed: Aug. 29, 2018

(65) Prior Publication Data
US 2020/0074005 A1 Mar. 5, 2020

(51) Int. Cl.
G06F 16/9535 (2019.01)
(52) U.S. Cl.
CPC .................. G06F 16/9535 (2019.01)
(58) Field of Classification Search
CPC .................................. G06F 16/9535
USPC .......................................... 707/706
See application file for complete search history.

(56) References Cited

U.S. PATENT DOCUMENTS

| 7,254,580 B1 * | 8/2007 | Gharachorloo ..... G06F 16/2471 |
| 7,289,985 B2 * | 10/2007 | Zeng ..................... G06F 16/951 707/749 |
| 7,693,836 B2 | 4/2010 | Brave et al. |
| 7,904,442 B2 | 3/2011 | Bahn |
| 8,244,721 B2 * | 8/2012 | Morris ................ G06F 16/9032 707/723 |
| 8,255,413 B2 | 8/2012 | Bennett et al. |
| 8,380,721 B2 | 2/2013 | Attaran Rezaei et al. |
| 8,631,006 B1 * | 1/2014 | Haveliwala ......... G06F 16/9535 707/732 |
| 8,788,260 B2 | 7/2014 | Nygaard et al. |

(Continued)

FOREIGN PATENT DOCUMENTS

EP     3028185 A1     6/2016

OTHER PUBLICATIONS

Gonzalez-Caro et al., "Different Users and Intents: An Eye-tracking Analysis of Web Search", WSDM '11, Feb. 9-12, 2011, Hong Kong, China, 8 pages. (Year: 2011).*

(Continued)

Primary Examiner — Phuong Thao Cao
(74) Attorney, Agent, or Firm — Michael O'Keefe; Andrew D. Wright; Roberts Calderon Safran & Cole, P.C.

(57) ABSTRACT

Systems and methods for collaborative creation of content snippets are disclosed. In embodiments, a method of the invention includes: receiving, by a computing device, indications from multiple users over time that content is of value, wherein the indications are in the form of computer-based actions from multiple user devices monitored by the computing device; dynamically generating, by the computing device, a collaborative snippet based on the indications from the multiple users, wherein the collaborative snippet is auto-tagged by the computing device with context data such that the collaborative snippet includes one or more tags; and saving, by the computing device, the collaborative snippet in a snippet database.

20 Claims, 4 Drawing Sheets

(56) References Cited

U.S. PATENT DOCUMENTS

| | | | |
|---|---|---|---|
| 8,959,541 B2* | 2/2015 | Conrad | H04N 21/6582 |
| | | | 725/12 |
| 8,990,193 B1* | 3/2015 | Reynar | G06Q 30/02 |
| | | | 707/726 |
| 9,015,143 B1* | 4/2015 | Sahin | G06F 16/9535 |
| | | | 707/706 |
| 9,081,814 B1* | 7/2015 | Carroll | G06F 40/295 |
| 9,239,883 B2* | 1/2016 | Smyth | G06F 16/9535 |
| 9,569,432 B1* | 2/2017 | Marra | G06F 16/00 |
| 9,715,901 B1* | 7/2017 | Singh | H04N 21/8456 |
| 9,775,512 B1* | 10/2017 | Tyler | A61B 3/0025 |
| 10,104,403 B1* | 10/2018 | Ekambaram | H04N 21/8126 |
| 10,289,742 B2* | 5/2019 | Naqvi | G06Q 10/1093 |
| 10,621,220 B2* | 4/2020 | Zheng | G06F 16/334 |
| 2005/0234880 A1* | 10/2005 | Zeng | G06F 16/957 |
| 2006/0041562 A1* | 2/2006 | Paczkowski | G06F 16/9562 |
| 2006/0161542 A1* | 7/2006 | Cucerzan | G06F 16/345 |
| 2007/0168946 A1* | 7/2007 | Drissi | G06F 8/71 |
| | | | 717/110 |
| 2007/0244906 A1* | 10/2007 | Colton | G06Q 10/10 |
| 2008/0040301 A1* | 2/2008 | Sadagopan | G06Q 30/02 |
| | | | 706/16 |
| 2008/0281810 A1* | 11/2008 | Smyth | G06F 16/951 |
| 2009/0171649 A1* | 7/2009 | Kishore | G06F 30/20 |
| | | | 703/22 |
| 2010/0010987 A1* | 1/2010 | Smyth | G06F 16/9535 |
| | | | 707/E17.014 |
| 2010/0082747 A1* | 4/2010 | Yue | G06F 16/954 |
| | | | 709/204 |
| 2011/0035403 A1* | 2/2011 | Ismalon | G06F 16/242 |
| | | | 707/769 |
| 2011/0252044 A1* | 10/2011 | Shin | G06F 16/335 |
| | | | 707/749 |
| 2012/0117049 A1* | 5/2012 | Zhou | G06F 16/951 |
| | | | 707/706 |
| 2012/0158693 A1* | 6/2012 | Papadimitriou | G06F 16/951 |
| | | | 707/708 |
| 2012/0278065 A1* | 11/2012 | Cai | G06Q 30/0278 |
| | | | 704/9 |
| 2013/0117161 A1* | 5/2013 | Waidmann | G06Q 30/06 |
| | | | 705/27.1 |
| 2013/0218871 A1* | 8/2013 | McConnell | G06F 16/248 |
| | | | 707/722 |
| 2013/0325851 A1* | 12/2013 | Crudele | G06F 16/248 |
| | | | 707/722 |
| 2014/0101193 A1* | 4/2014 | Dorohonceanu | |
| | | | G06F 16/24575 |
| | | | 707/769 |
| 2014/0129542 A1* | 5/2014 | Haveliwala | G06F 16/9535 |
| | | | 707/710 |
| 2014/0351000 A1* | 11/2014 | Tsai | G06Q 30/0201 |
| | | | 705/7.29 |
| 2015/0039603 A1* | 2/2015 | Alonso | G06F 16/9535 |
| | | | 707/728 |
| 2015/0058355 A1* | 2/2015 | Naqvi | G06F 16/328 |
| | | | 707/746 |
| 2015/0074072 A1* | 3/2015 | Jain | G06F 16/338 |
| | | | 707/706 |
| 2015/0161261 A1* | 6/2015 | Griddaluru | G06F 16/338 |
| | | | 707/707 |
| 2015/0347973 A1* | 12/2015 | Singh | G06Q 10/1053 |
| | | | 705/321 |
| 2016/0055259 A1* | 2/2016 | Ghanekar | G06F 16/345 |
| | | | 707/706 |
| 2016/0064033 A1* | 3/2016 | Koul | G10L 13/10 |
| | | | 704/270 |
| 2016/0171111 A1* | 6/2016 | Kraft | G06F 16/9535 |
| | | | 707/706 |
| 2016/0189198 A1* | 6/2016 | McKenzie | G06Q 30/0276 |
| | | | 705/14.41 |
| 2016/0196204 A1* | 7/2016 | Allen | G06F 16/3331 |
| | | | 717/125 |
| 2016/0283585 A1* | 9/2016 | Zheng | G06F 16/345 |
| 2016/0335346 A1* | 11/2016 | Haveliwala | G06F 16/24578 |
| 2017/0017721 A1* | 1/2017 | Sauper | G06F 16/248 |
| 2017/0031433 A1* | 2/2017 | Abou Mahmoud | G06F 3/013 |
| 2017/0132229 A1* | 5/2017 | Parihar | G06F 16/9024 |
| 2017/0206250 A1* | 7/2017 | Loomans | G06Q 50/01 |
| 2017/0357875 A1* | 12/2017 | Hardee | G06K 9/6201 |
| 2018/0040164 A1* | 2/2018 | Newman | G09G 3/2092 |
| 2018/0144059 A1* | 5/2018 | Saikia | G06F 16/957 |
| 2018/0152410 A1* | 5/2018 | Jackson | H04L 67/02 |
| 2018/0232460 A1* | 8/2018 | Goryachev | G06F 16/9535 |
| 2018/0246983 A1* | 8/2018 | Rathod | G06F 40/186 |
| 2018/0268063 A1* | 9/2018 | Pawar | G06F 16/248 |
| 2018/0302682 A1* | 10/2018 | Saxena | G06Q 50/01 |
| 2019/0057088 A1* | 2/2019 | Chander | H04L 67/42 |
| 2019/0079934 A1* | 3/2019 | Liao | G06F 16/248 |
| 2019/0199763 A1* | 6/2019 | Demirli | H04L 65/602 |
| 2019/0303141 A1* | 10/2019 | Li | G06F 16/9038 |

OTHER PUBLICATIONS

Granka et al., "Eye-Tracking Analysis of User Behavior in WWW Search", SIGIR '04, Jul. 25-29, 2004, Sheffield, South Yorkshire, UK, pp. 478-479. (Year: 2004).*

Marcos et al., "Effect of Snippets on User Experience in Web Search", in Proceedings of the 16th International Conference on HCI, ACM, 2015, New York, pp. 47:1-47:8. (Year: 2015).*

"Snagit 13.0.2", Softonic.com, <https://snagit.en.softonic.com/>, Accessed Aug. 27, 2018, 5 pages.

* cited by examiner

COLLABORATIVE CREATION OF CONTENT SNIPPETS

BACKGROUND

The present invention relates generally to computer search systems and, more particularly, to collaborative creation of content snippets.

Currently, search engines utilize a variety of tools for selecting documents for inclusion in search results. Typically, search engines utilize keyword based categorization, indexing, matching, and ranking of documents. Search results may include text-based summaries of respective documents, which summarize or characterize the documents (e.g. web pages). Tools also exist that enable users to share information of interest with others through the creation of a screen capture or screen recording of content (e.g., documents, videos, etc.).

SUMMARY

In an aspect of the invention, a computer-implemented method includes: receiving, by a computing device, indications from multiple users over time that content is of value, wherein the indications are in the form of computer-based actions from multiple user devices monitored by the computing device; dynamically generating, by the computing device, a collaborative snippet based on the indications from the multiple users, wherein the collaborative snippet is auto-tagged by the computing device with context data such that the collaborative snippet includes one or more tags; and saving, by the computing device, the collaborative snippet in a snippet database.

In another aspect of the invention, there is a computer program product including a computer readable storage medium having program instructions embodied therewith. The program instructions are executable by a computing device to cause the computing device to: receive a search query including search terms from a user initiating a search session; determine search results, including at least one snippet from a snippet database, based on the search query; present the search results with the at least one snippet to the user; receive an indication of content of value from at least one user, wherein the content of value is content from the search results; generate a new snippet based on the indication of content of value, wherein the new snippet is tagged with context data including the search terms; and save the new snippet in the snippet database.

In another aspect of the invention, there is a system including: a processor, a computer readable memory and a computer readable storage medium associated with a computing device; program instructions to monitor search results from multiple participants in a social network to determine most used search results of the multiple participants based on similar search queries; program instructions to generate one or more collaborative snippets based on the most used search results of the multiple participants, wherein the one or more collaborative snippets comprise a small region of reusable source code, machine code or text created from content of the most used search results and enabling visualization of the content; program instructions to automatically tag the one or more collaborative snippets with context data; and program instructions to save the one or more collaborative snippets in a snippet database of the social network, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
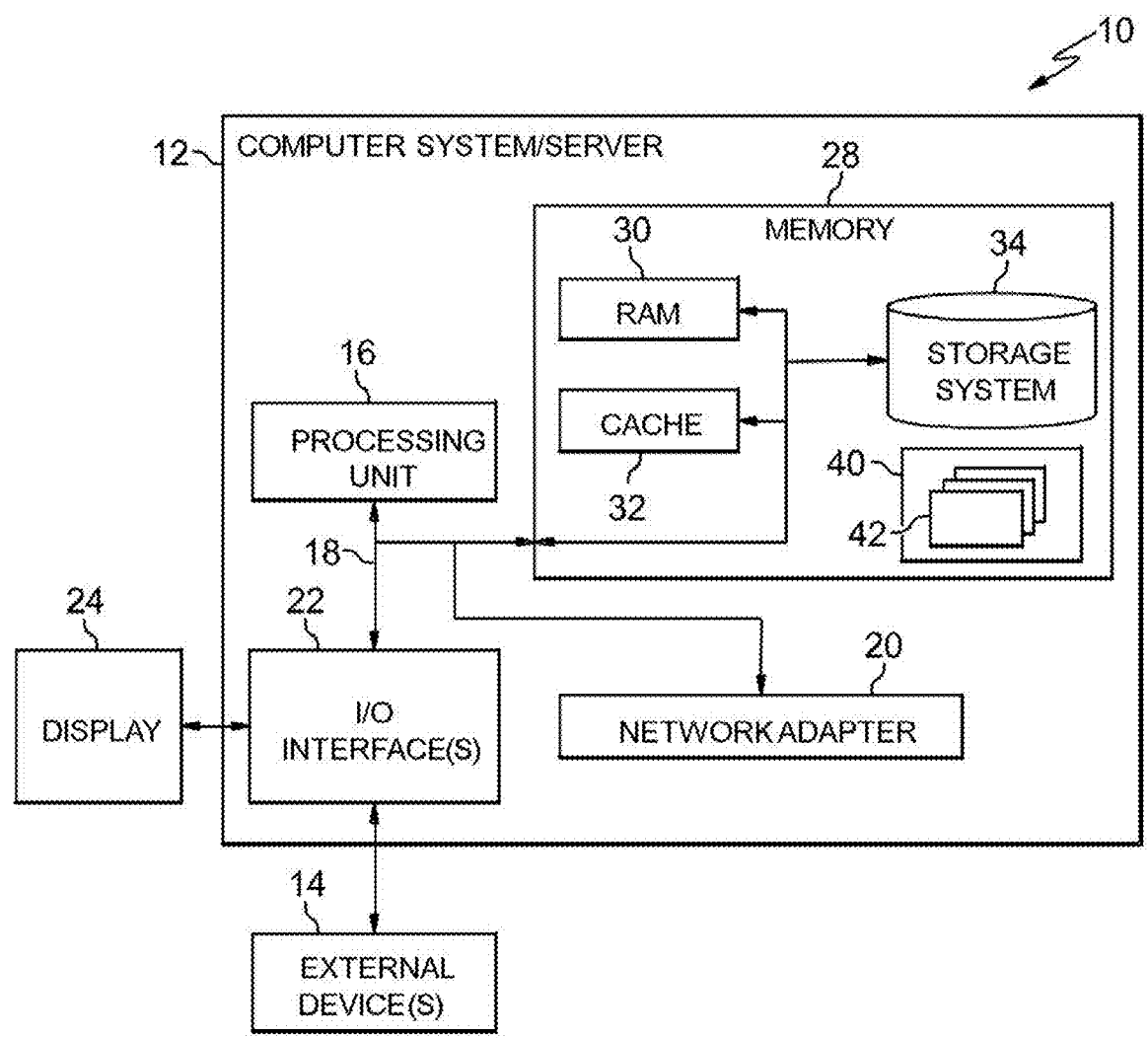
FIG. 1 depicts a computing infrastructure according to an embodiment of the present invention.

The present invention relates generally to computer search systems and, more particularly, to collaborative creation of content snippets. In embodiments, a system is provided for collaboratively creating snippets from the input of multiple users across multiple computer platforms.

Typically, search engines utilize content tags when generating results to a search query. Different authors and different types of computer platforms may use different tags for their content that is often not cross platform or even cross document enabled. Often, this leads to a variety of search results with mixed results and an extremely broad range of materials returned that require the user to review the materials in detail to understand the material's relevance. When researching topics, a user usually has to navigate through a large amount of content to find small relevant portions of useful content. These small portions of useful content may also be useful to associates of the user. Accordingly, it would be beneficial for associates of the user to have access to the small portions of relevant content.

Advantageously, embodiments of the present invention provide a technical solution to the technical problem of obtaining relevant computer search results by providing a system and method for collaborative creation of categorized snippets of content that are shared amongst participants. The term snippet as used herein refers to a small region of reusable source code, machine code or text created from content and enabling visualization of the content (e.g., text, videos, photographs, etc.), wherein the content of the snippet is not tied to a specific area of a computer display. In aspects, the snippet is created to capture content of value to one or more users, as opposed to snippets created to summarize or describe search result content. For example, a snippet may be a particular paragraph from a document, a portion of a photograph, or a web page determined to be of value to one or more users.

Advantageously, embodiments of the invention enable snippets of relevant content to be presented to a user even if the location of the original content source moves. In embodiments, the invention enables the creation of collaborative snippets from the input of multiple users across multiple platforms who have successfully navigated content and secured useful results. Embodiments of the invention enable collaborative creation of snippets by tagging snippets with metadata, search terms, source document information, date, and user information, for example. In one illustrative example, a first user is searching online wikis, forums, and websites for "cognitive computing", and finds four (4)

relevant articles out of a search of twenty (20), and a second user is searching online and finds three (3) relevant articles for "cognitive computing" out of fifteen (15). In this example, the invention enables the users to create snippets from the articles and tag the snippets for future research and discovery, resulting in the generation of categorized (e.g., emails, blogs, wikis, etc.) snippets for cognitive computing including tags from one or more users, which are accessible by all system users. In some aspects, users generate snippets and in other aspects, a computer system, using cognitive capabilities, flags content that gets the most attention over a period of time and creates snippets based on the flagged content.

In aspects, a system of the invention creates snippets that show content that is cross document and cross platform. In one example, a first user looks at doc1, wiki34, and forum54 regarding "agile in Cognitive". The system of the invention then publishes a snippet that allows others to reactivate (access the content of) doc1, wiki34, and forum54 regarding "Agile in Cognitive". In embodiments, the snippet allows others to view contact information of the user who created and/or previously accessed the snippet (e.g., if access to the user profiles is enabled). Thus, embodiments of the invention provide a system for social collaboration on like-minded searching and creation of snippets.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
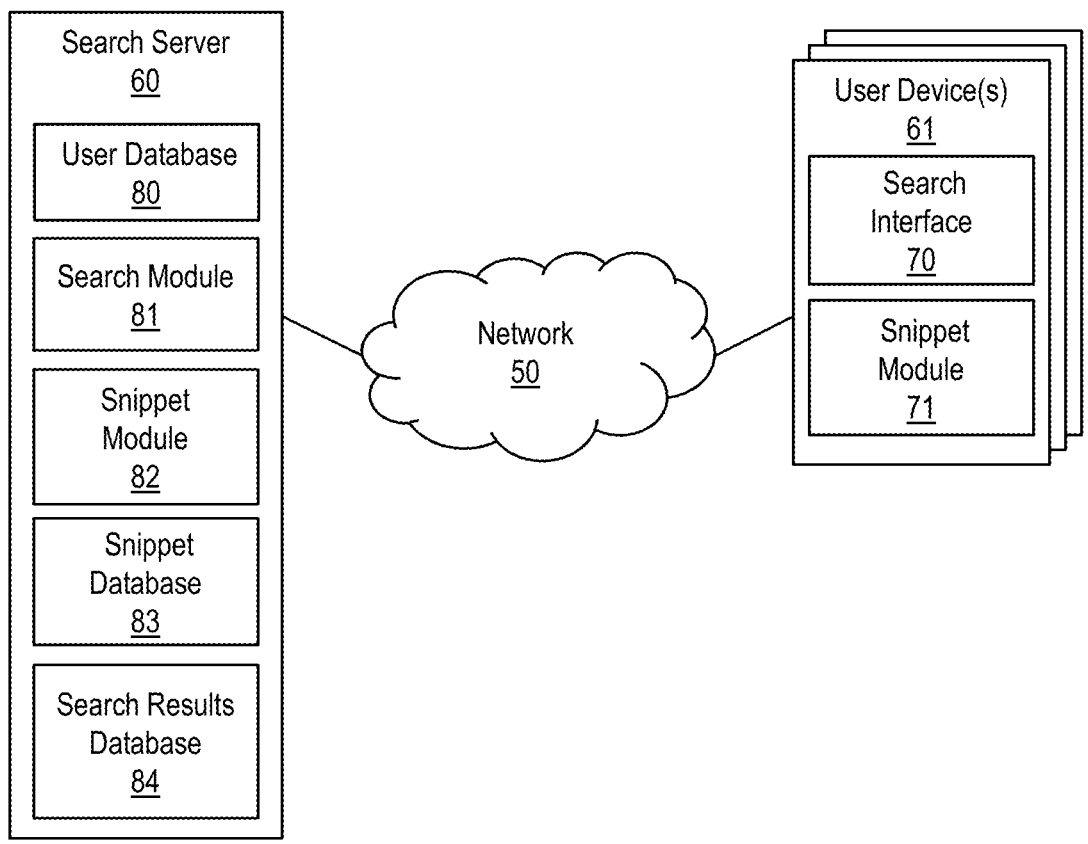
FIG. 2 shows an exemplary environment in accordance with aspects of the invention.

FIG. 2 shows an exemplary environment in accordance with aspects of the invention. The environment includes a network 50 connecting a search server 60 of the present invention with one or more user devices 61. The search server 60 may comprise a computer system 12 of FIG. 1, and may be connected to the network 50 via the network adapter 20 of FIG. 1. The search server 60 may be configured as a special purpose computing device that is part of a web search engine infrastructure. For example, the search server 60 may be configured to receive a search query generated by a user computer device 61, coordinate the execution of the search query, and format the result of the search query into an HTML page that is returned to the user computer device 61.

In embodiments, the network 50 is any suitable communication network or combination of networks, such as a local area network (LAN), a general wide area network (WAN), and/or a public network (e.g., the Internet). In aspects, the user device 61 is in the form of the computing device 12, and may be a desktop computer, laptop computer, tablet computer, smartphone, or other user computer device In embodiments, the user device 61 runs a browser application program via a search interface 70 that provides an interface (e.g., a web page) by which a user may enter (e.g., type) a search query to be submitted to the search server 60. The user device 61 may include one or more program modules (e.g., program module 42 of FIG. 1) configured to perform the functions described herein. In embodiments, the user device 61 includes a snippet module 71 configured to enable a user to select one or more portions of content to be transformed into snippets.

Still referring to FIG. 2, in embodiments, the search server 60 includes a user database 80 configured to receive user profile data for a plurality of participants. User profile data may include, for example, the name of a user, identification information for one or more user devices 61 associated with the user, access authorizations, work projects associated with the user, location of the user, or other user data. In aspects, the search server 60 includes one or more program modules (e.g., program module 42 of FIG. 1) configured to perform the functions described herein. In embodiments, a search module 81 of the search server 60 is configured to receive a search query from a user device 61 (e.g., via the search interface 70), generate a search result based on the search query, and return the search result to the user device 61 through the network 50. In aspects, the search server 60 includes a snippet module 82 configured to create snippets based on data supplied by a user, either directly or indirectly. For example, the snippet module 82 may obtain information from the snippet module 71 of the user device 61 indicating content to be transformed into a snippet. In another example, the snippet module 82 may obtain information regarding a user's interest level in particular content (e.g., based on the user clicking on the content, opening links associated with the content, etc.) from the user device 61 (e.g., via the search interface 70). In aspects, the search server 60 includes a snippet database 83 for storage of snippets generated by the snippet modules 71, 82. Alternatively, a snippet database 83 remote from the search server 60 stores snippets generated by the search server 60. In embodiments, a search results database 84 of the search server 60 stores information regarding searches conducted by users, such as historic search queries and results.

In embodiments, the search server 60 may include additional or fewer components than those shown in FIG. 2. In embodiments, separate components may be integrated into a single computing component or module. Additionally, or alternatively, a single component may be implemented as multiple computing components or modules. Similarly, the user device 61 may include additional or fewer components than those shown in FIG. 2.

Figure 3:
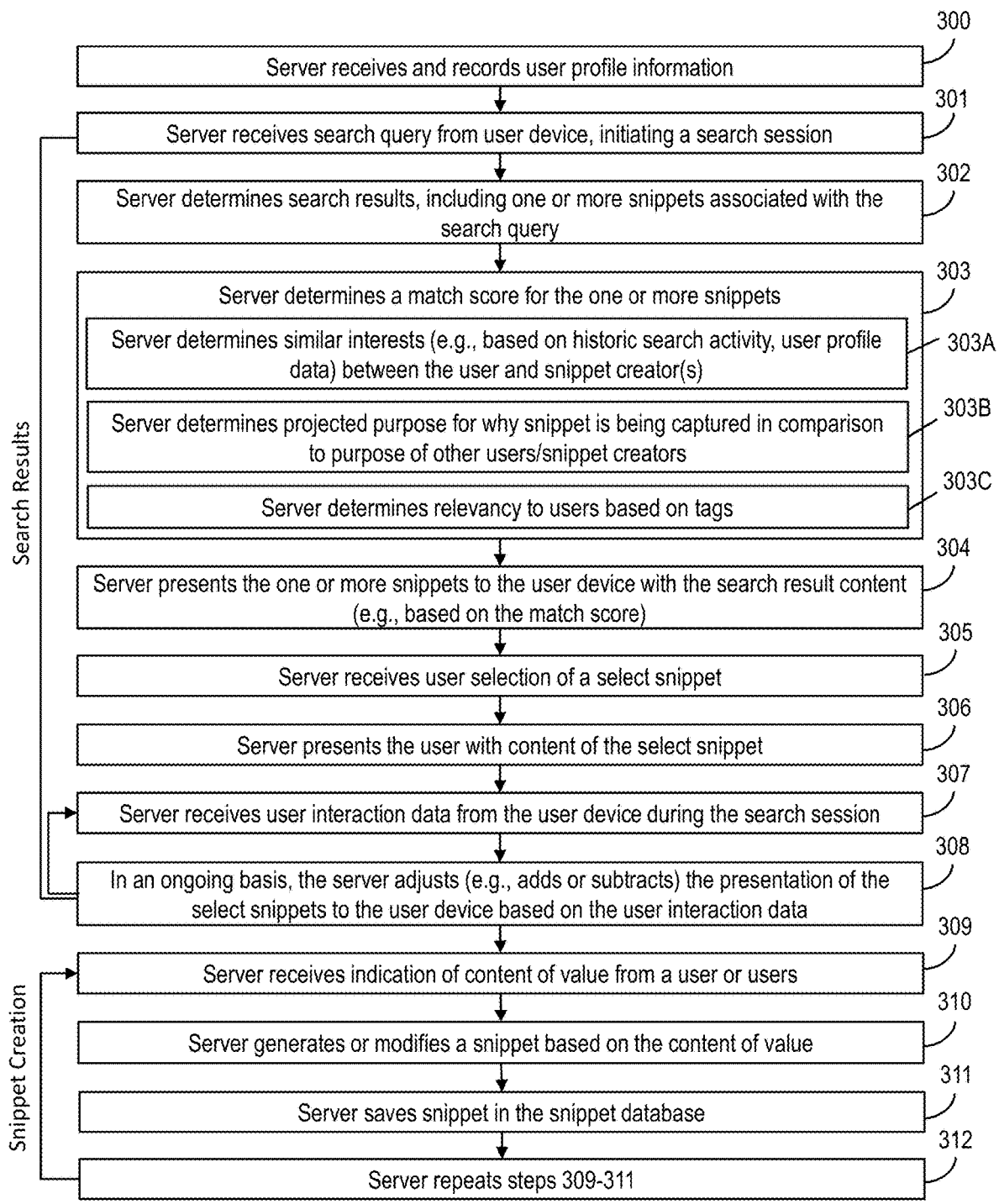
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the search server 60 receives user profile information for a plurality of participants or registered users, and records the user profile information in the user database 80. In embodiments, the registered users are participants in a social network environment. In aspects, the search server 60 receives user profile information from users via the user device 61. User profile data may include, for example, the name of a user, identification information for one or more user devices 61 associated with the user, access authorizations, work projects associated with the user, location of the user, or other user data. To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information. In embodiments, the method of FIG. 3 may be enabled on any social platform where authenticated users navigate (e.g., users registered with the search server 60) content.

At step 301, the search server 60 receives a search query from a user. In aspects, the search server 60 receives a search query through the search interface 70 of the user device 61. A variety of search query tools and methods may be utilized in the implementation of step 301.

At step 302, the search server 60 generates results to the search query received at step 301, including one or more snippets. In aspects, the search module 81 of the search server 60 generates search results including one or more snippets from the snippet database 83. In aspects, the search module 81 of the search server 60 generates results based on matches between search query terms received at step 301 and one or more tags of snippets in the snippet database 83. Tags of snippets in the snippet database 83 may comprise metadata of search terms (e.g., keywords), source documents, data, associated user information, and other information regarding the content of the snippet and history of snippet use.

At step 303, the search server 60 determines a match score for the one or more snippets of step 302 (hereafter select snippets). In aspects, match scores are numeric relevance scores assigned to the select snippets that indicate the level of relevance each select snippet is determined to have with respect to the user who submitted the search query. In aspects, the search server 60 includes a cognitive engine that determines matches based on context data (e.g., similar interests of users, similar purpose of search query, etc.). In aspects, a cognitive engine of the search module 81 may utilize user data from the user database 80, the search results database 84, application data of the user device 61 (e.g., email or calendar data), or data from a remote source, such as a third party provider (not shown). For example, in aspects, third party provider data that may be accessed by the search module 81 includes calendar/scheduling or email data of users. In embodiments, the determination of the match score is performed in accordance with substeps 303A-303C as described below.

At substep 303A, the search module 81 of the search server 60 determines similar interests between the user and other users associated with the select snippets, such as creators of the snippets. The term creator as used herein refers to users who directly created a snippet or who's activities triggered the creation of the snippet by the search server 60. In aspects, the search module 81 compares data of the user from the user database 80 with data of the creator of a select snippet from the user database 80, wherein the creator of the select snippet is identified by the search module 81 utilizing a tag of the select snippet (e.g., creator identification metadata of the snippet). For example, the user database 80 may include user data indicating that the user who submitted the search query at step 301 is part of the same work group as the creator of a select snippet. In embodiments, the search module 81 identifies similarities between the user's search history and the search history of a creator of a select snippet, utilizing historic search information stored in the search results database 84 of the search server 60.

At substep 303B, the search module 81 of the search server 60 determines a projected purpose regarding why a select snippet is matched to the search query of step 301, and compares it with projected purposes of other users and/or the creator of the select snippet to determine a level of matching. The term projected purpose as used herein refers to the computer determined reason for the selection or creation of a snippet, as determined through cognitive computing of the search server 60. In embodiments, a cognitive engine of the search module 81 determines the projected purpose of users/creators based on user profile data in the user database 80, historic search result data in the search results database 84, sources of user data from the user device 61, or other sources of user data, such as calendar data which the search module 81 has been authorized to access.

Still referring to step 303B, in one example, a first user who submits a search query for "Las Vegas" is part of a workgroup that is going to a conference in Las Vegas, as determined by user data gathered by the search module 81. In this example, a select snippet having tags associated with "Las Vegas" was created by a second user for the purpose of a family vacation, as determined by the search module 81 utilizing historic calendar and search results data of the creator of the select snippet. In other words, the search module 81 in this example determines that the reason the select snippet was created was the family vacation, based on a recognition of family vacation data in the user's calendar and historic search result data indicating the user's interest in results relevant to the family vacation. In this scenario, the projected purpose of the first user (work conference) is different from the projected purpose of the second user (family vacation), resulting in a lower match score (e.g., a match score of 5 out of 10) than would be the case when the projected purposes are the same or similar. In another example, the search module 81 determines that most users (>50% of users) who accessed the select snippet associated with "Las Vegas" where determined to access the snippet for the purpose of a prior work conference. In this case, the projected purpose of the first user (i.e., work conference) is similar to the projected purpose of the other users who accessed the select snippet (i.e., prior work conference), and the search module 81 assigns a higher match score (e.g., a match score of 8 out of 10) than in the previous example.

At step 303C, the search server 60 scores snippets based on tags of the snippets. In one example, a snippet includes a tag related to a user's previous interaction with the snippet. For example, the snippet may include a tag indicating that a first user has tagged the snippet with a smiley face icon (e.g., via a user interface of the user device 61) to indicate that the user finds the snippet humorous. In another example, the search engine 60 may recognize that the user is searching for fun motivational Java snippets to add to a presentation, and based on users' collaborative reactions to snippets in the snippet database 83, tags snippets of humor and presents the tagged snippets to the user in accordance with step 304 below.

At step 304, the search server 60 presents the select snippets to the user device 61 with results of the search query of step 301. In aspects, the search server 60 generates both standard search results such as may be generated by existing search tools, and select snippets generated in accordance with methods of the present invention. In embodiments, the search module 81 of the search server 60 presents the select snippets to the user through the search interface 70 of the user device 61. The select snippets may be presented in a variety of ways, including through a list of results separate from standard search results generated by the search module 81, a list of results including select snippets and standard search results, and pop-up results (i.e. select snippets in a pop-up window). The select snippets may be displayed as images, text, a link to content, or combinations thereof. It should be understood that the invention is not intended to be limited to the presentation of select snippets discussed in the examples herein.

In embodiments, the select snippets are presented to the user based on one or more filters that are either automatically implemented by the search server 60, or that are selected by a user. For example, the search sever 60 may automatically present a list of select snippets to a user in order of relevance (e.g., from most relevant to least relevant) based on the match score determined at step 303. In aspects, the search server 60 presents the match score or other relevancy indicator to the user with each of the select snippets. Relevancy indicators may include visual indicators such as font color, size, icons, numeric scoring, etc.

At step 305, the search server 60 receives a user selection of a select snippet. In aspects, the user select may comprise the user clicking or otherwise selecting the select snippet using a selection tool (e.g., touchscreen, mouse, etc.). In aspects, the search module 81 receives the user selection from the search interface 70 of the user device 61 via the network 50.

At step 306, the search server 60 presents the user with content of the snippet selected by the user at step 305. In aspects, the search module 81 determines content in the snippet database 83 to present to a user based on the selection at step 305, and presents the user with the content through the search interface 70 of the user device 61. Snippet content may be in the form of images, text, audio or video data, or a combination therefore, for example. In embodiments, the search server 60 presents the user with the snippet content and the location of the original content from which the snippet was originally created. For example, the search server 60 may present the user with a portion of a news article and the location (e.g., a hyperlink) of the original news article. In embodiments, clicking on a snippet in accordance with step 305 will cause the search server 60 to navigate the user to the source of the content (e.g., the original source content, location and full body text version) at step 306, calling up the associated webpage, wiki or forum where the snippet creator sourced the content.

At step 307, the search server 60 receives user interaction data from the user device 61 during the search session. User interaction data may be any data indicating a user's interactions with the search results presented to them in accordance with step 306. In embodiments, user interaction data is in the form of data indicating links the user has clicked on, snippets the user has created (e.g., in accordance with steps 309-311 below), snippets the user has clicked on, and/or search result content the user has opened and/or viewed. The search server 60 may receive user interaction data from multiple participants navigating through content over multiple computer platforms. In aspects, the search server 60 saves user interaction data in the search results database 84.

At step 308, the search server 60 adjusts the presentation of select snippets (in the search results) to the user based on the user interaction data. In aspects, step 308 is performed in an ongoing basis based on real-time user interaction data received at step 307. In embodiments, the search module 81 performs step 308, wherein select snippets are added or subtracted from the search result content based on the user interaction data. In aspects, step 308 incorporates step 303, wherein the search server 60 re-evaluates match scores for select snippets based on user interaction data and/or other data relevant to determining match scores (e.g., similar interest data, projected purpose data, relevancy based on tags of the snippets, etc.), and presents the select snippets to the user based on adjusted match scores.

Moreover, step 308 may be conducted based on user interaction data of multiple users. In one example, a collaborative snippet including a map of a convention center is presented to multiple users searching for "convention center". Over time, the search server 60 determines that most users presented with the collaborative snippet (>50%) do not select the collaborative snippet or spend little or no time reviewing the content of the collaborative snippet. In this example, the search server 60 removes the collaborative snippet from the snippet database 83 and/or removes a tag from the collaborative snippet associating the collaborative snippet with the search term "convention center". Thus, the snippet database 83 may be maintained by the search server 60 with the most pertinent and up-to-date snippets useful to participants as the interests or needs of the participants shift over time At step 309, the search server 60 receives an indication of content of value from one or more users/participants. In accordance with embodiments of the invention, the indication of content of value is a computer-based action taken by one or more users utilizing a user device 61, indicating that they are interested in particular content (e.g., content presented in the search results at step 304). In aspects, the search server 60 determines that content is of interest when a user adds the content to a snippet clipboard, drags and drops selected content to a snippet icon or window, highlights content, copies and pastes content or takes other actions to select content from an original source of content.

With continued reference to step 309, in embodiments, the search server 60 utilizes visual monitoring of the user's content browsing to determine content of value to the user. In one example, image analysis software tools are utilize to analyze image data of a user as the user browses content on the user computer device 61, wherein the image analysis software tools determines which content a user focuses on (e.g., using eye tracking techniques) or spends the most time on. The content of value may be the entirety of an original source of content, or may be a portion of content taken therefrom. In aspects, the snippet module 82 of the search server 60 performs step 309. Various tools for determining a user's actions with respect to content may be utilized by the search server 60 in the performance of step 309. In one example, the search server 60 is enabled to detect how users interact with areas of content either through browsing or by visually monitoring users' browsing actions, so that when a user drags a cursor over content, a snippet is compiled from the content in accordance with step 310.

At step 310, the search server 60 generates or modifies a stored snippet based on the content of value determined at step 309. In aspects, the snippet module 82 of the search server 60 generates a new snippet based on the indication of the content of value received at step 309, wherein the snippet includes one or more tags indicating the context in which the snippet is created. In embodiments, the search server 60 generates or modifies a stored snippet when a threshold value has been met with respect to the number of users interested in the content of value and/or the context related to the content of value (e.g., 10 users searching for "convention center" have interacted with the content of value). As previously noted, tags of snippets may comprise metadata of query search terms (e.g., keywords), source document data, associated user information, and other information regarding the content of the snippet and history of snippet use. In one example, a snippet is created based on search result content dragged and dropped into a snippet clipboard, wherein the snippet module 82 tags the snippet with metadata regarding search terms utilized to generate the search results, and the user who created the snippet (e.g., the user who entered the search results).

Still referencing step 310 of FIG. 3, in embodiments, the search server 60 recognizes that the content of value determined at step 309 matches an existing snippet in the snippet database 83, and updates the snippet to include context tags. For example, the search server 60 may recognize that a map of a convention center selected by the user (i.e., content of value) already exists as a snippet in the snippet database 83, and modifies tags associated with the snippet to include metadata regarding search terms utilized to generate search results associated with the content, as well as metadata to identify the user who selected the map of the convention center. In this way, a snippet may accumulate tags over time from different sources (e.g., multiple users and multiple user devices/platforms), wherein the tags reflect usage across an organization or group of participants. For example, a snippet comprising a map of a convention center may be tagged with metadata associating the snippet with ten (10) different participants, wherein the metadata provides context of the usage (e.g., when the snippet was accessed, who accessed the snippet, and search terms utilized in association with the snippet). Thus, embodiments of the invention enable the creation of collaborative snippets that reflect the context of usage for multiple users within an organization/network, based on users' navigation of associated content and/or inputs.

In embodiments, the search server 60 dynamically and cognitively generates or updates a collaborative snippet for the most used and/or most valued search results of multiple participants, based on similar searching for like content. In aspects, the snippet module 81 generates or updates a snippet based on cumulative user interaction data indicating content of value to multiple users. In one example, the snippet module 81 recognizes that multiple users have copied particular paragraphs from an internal procedures manual during search sessions involving "Regulation X", "X regulation", and "procedures for X", thus recognizing that the content is content of value to multiple users with respect to similar search queries or sessions regarding "Regulation X". In this example, the snippet module 81 generates one or more collaborative snippets from the content of value upon meeting a threshold (e.g., ten (10)

participants have copied a paragraph from the internal procedures manual when searching for Regulation X). Thus, in aspects, the search server 60 determines content of value to multiple users at step 309 and generates a series of tagged collaborative snippets based on the content of value. In embodiments, the search server 60 utilizes natural language processing (NLP) tools to identify the subject matter of the snippets and/or search query term utilized in association with the snippets and auto-tag collaborative snippets based on the NLP analysis, wherein the tags can be utilized by the search server 60 to arrange the collaborative snippets by user preferences or demographics. In embodiments, the auto-generated tags are utilized in the filtering, arranging and/or sorting of search content (e.g., presented according to step 304) for viewing by a user.

At step 311, the search server 60 stores new snippets or updated snippets generated at step 310 in the snippet database 83. While shown as part of search server 60, it should be understood that the snippet database 83 can be remote from the search server 60. In embodiments, the snippet database 83 is cloud-based storage. In aspects, collaborative snippets of the present invention are stored in the cloud as part of cloud-based search services. In embodiments, the snippets are stored in the snippet database 83 based on context, which is separate from any specific location of the snippet content. In this way, the search server 60 may find relevant snippets even if the location of the snippet content has moved. In aspects, users may also store snippets on local/hybrid storage, for accessing offline.

At step 312, the search server 60 repeats steps 309-311. In accordance with embodiments of the invention, the snippet module 82 of the search server 60 continuously creates and modifies snippets (e.g., collaborative snippets) based on input from multiple users in accordance with step 309.

Figure 4:
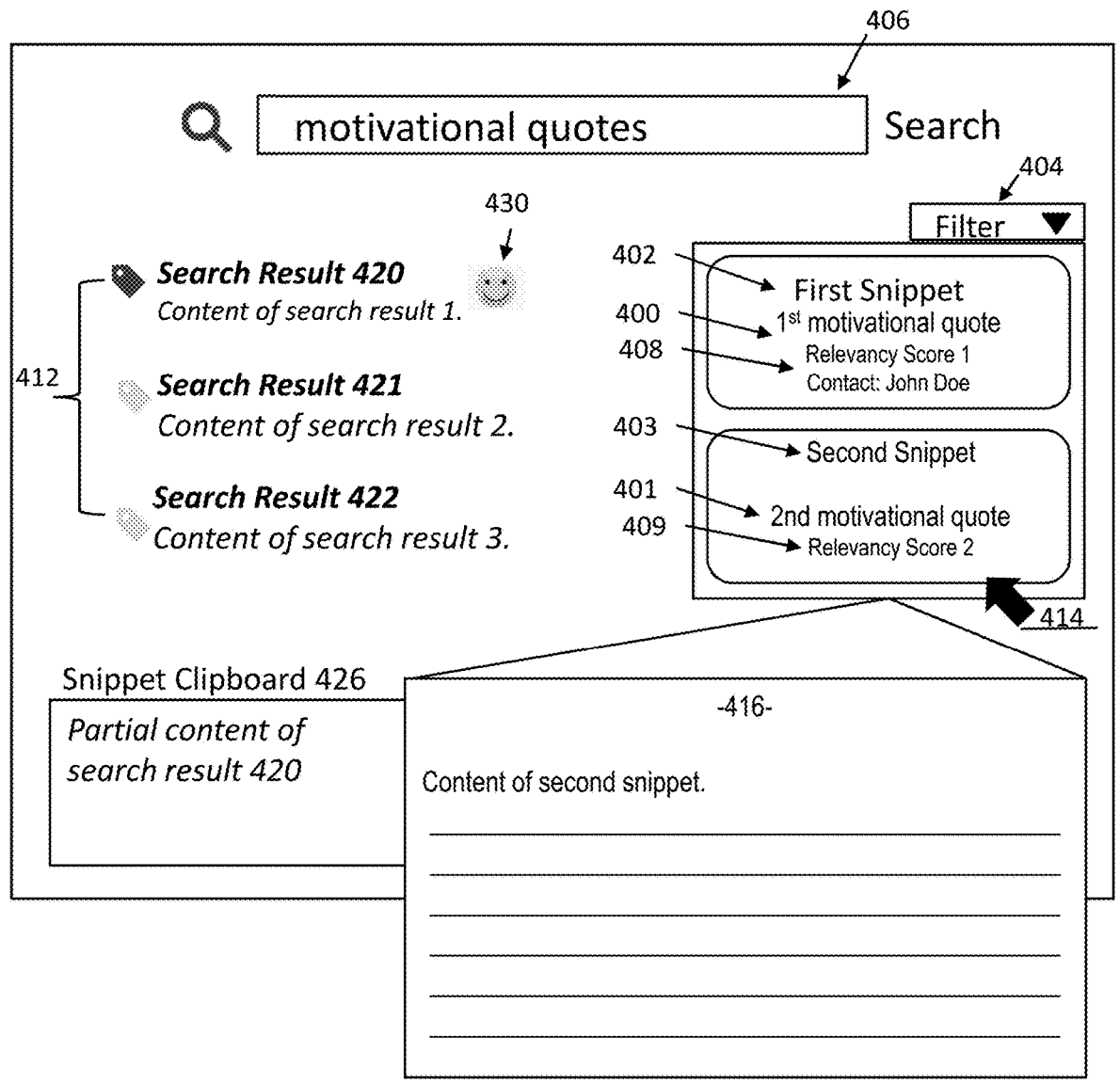
FIG. 4 shows an exemplary use scenario in accordance with embodiments of the invention.

FIG. 4 is an exemplary use scenario in accordance with embodiments of the invention. The scenario of FIG. 4 utilizes steps from FIG. 3 in the environment of FIG. 2.

In the scenario of FIG. 4, first and second users search through twenty (20) websites each for motivational content and find short motivational quotes. In accordance with step 309 of FIG. 3, the search server 60 determines that the motivational quotes are content of value to the first and second users (original users). For example, the search server 60 determines that the first user finds a first ($1^{st}$) motivational quote 400 of value when the user highlights the quote, copies the quote, or otherwise interacts with the quote in a meaningful way. Likewise the search server 60 determines that the second user finds a second ($2^{nd}$) motivational quote 401 of value when the user interacts with the quote in a meaningful way. The search server 60 then generates a first snippet 402 for the $1^{st}$ motivational quote 400, and a second snippet 403 for a 2nd motivational quote 401, wherein the first and second snippets 402 and 403 are tagged with the tag "motivational quotes" to provide context with respect to the value of the first and second snippets 402 and 403 to the original users. See step 310 of FIG. 3. In this scenario, the search server 60 also tags the source of content of the first and second snippets 402 and 403, references searching data, categorizes the first and second snippets 402 and 403 (e.g., image-based snippets), and saves the first and second snippets 402 and 403 in the snippet database 83 in accordance with step 311.

With continued reference to FIG. 4, a third user conducts a search for "motivational quotes" using a search interface 406 of the user computer device 61. The search server 60 receives the search query in accordance with step 301 of FIG. 3 and prioritizes the first and second snippets 402 and 403 based on relevance to the search query and dynamic cognitive relevance of link-minded search capabilities and scope, in accordance with step 303 of FIG. 3. As depicted in FIG. 4, the search server 60 presents the first and second snippets 402 and 403 to the user in accordance with step 304 of FIG. 3, wherein the first and second snippets 402 and 403 are presented based on their respective relevancy scores 408 and 409 determined according to step 303 of FIG. 3. In this example, a filter option 404 is provided that enables a user to selectively filter the snippet results based on a number of parameters (e.g., most recent, most relevant to the user, most relevant to the search query, etc.). In this scenario, the first and second snippets 402 and 403 are presented with standard search results indicated at 412. The standard search results in this scenario are generated utilizing standard search result methodology. FIG. 4 shows a user clicking on the second snippet 403 utilizing a selection tool represented by the arrow 414. Upon receiving the user interaction data in the form of the clicking, the search server 60 presents the user with content 416 of the second snippet 403 in a pop-out window in accordance with step 306 of FIG. 3.

FIG. 4 also depicts a user dropping a portion of the search result 420 content into a snippet clipboard 426. In accordance with step 309, the search server 60 recognizing the content in the clipboard 426 as being content of value to the third user, and generates a new third snippet (not shown) based on the indication of content of value, and saves the new third snippet in the snippet database 83 with a tag associating the snippet with "motivational quotes". Thus, it can be understood that when a new search is carried out for "motivational quotes", the search server 60 can quickly display the collaboratively created group of snippets (first, second and third snippets) in accordance with step 306 of FIG. 3, wherein a user can click on one or more of the group of snippets to be directed to or provided with the source of snippet content.

With continued reference to FIG. 4, in the scenario shown, indications of content of value according to step 309 may include user tags or indicators, such as the emoji 430 depicted in FIG. 4 indicating a user's emotions with respect to select content (e.g., a smiley face associates a feeling of happiness with the search result 420). Utilizing a cognitive engine, the search server 60 understands the direction of navigation and feelings of the third user, enabling the search server 60 to determine the context in which the third user is searching, and the user's personal style, in order to compile and present snippets of interest (e.g., first and second snippets 402 and 403) to the third user. Additionally, in the scenario depicted, the first user who is associated with the first snippet (i.e., creator of the snippet), has enabled the search server 60 to show his personal information (i.e., his name John Doe) in association with the first snippet, thereby providing the third user with more context regarding the relevance of the first snippet to the third user (e.g., the third user recognizes that John Doe is in the same work group).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for collaboratively and cognitively creating content snippets. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a computing device, image data from multiple users browsing content on respective user devices;
   determining, by the computing device, content of value to the multiple users by analyzing the image data of the multiple users using eye tracking techniques;
   dynamically generating, by the computing device, a collaborative snippet based on the content of value to the multiple users, wherein the collaborative snippet is auto-tagged by the computing device with context data such that the collaborative snippet includes tags comprising creator identification metadata for the multiple users; and
   saving, by the computing device, the collaborative snippet in a snippet database.

2. The computer-implemented method of claim 1, further comprising monitoring, by the computing device, browsing actions of the multiple users over time to determine the content of value.

3. The computer-implemented method of claim 1, wherein the generating the collaborative snippet is based on determining that the content of value is content of value to a number of users meeting a predetermined threshold.

4. The computer-implemented method of claim 1, further comprising:
   receiving, by the computing device, a search query from a user initiating a search session;
   determining, by the computing device, search results, including the collaborative snippet, based on the search query; and
   presenting, by the computing device, the search results with the collaborative snippet to the user.

5. The computer-implemented method of claim 4, further comprising determining, by the computing device, a match score for the collaborative snippet indicating a relevancy of the collaborative snippet to the user.

6. The computer-implemented method of claim 5, wherein the match score is determined based on a similarity of interests between the user and a creator of the collaborative snippet.

7. The computer-implemented method of claim 5, wherein the match score is determined based on a projected purpose of the user compared to a projected purpose of the creator of the collaborative snippet.

8. The computer-implemented method of claim 5, wherein the match score is determined based on relevancy to the user based on the tags of the collaborative snippet.

9. The computer-implemented method of claim 4, further comprising:
   receiving, by the computing device, a selection of the collaborative snippet; and
   presenting, by the computing device, content of the collaborative snippet to the user.

10. A computer program product comprising a computer readable storage medium having program instructions embodied therewith, the program instructions executable by a computing device to cause the computing device to:
    receive user data providing information about a user and storing the user data in a user database;
    receive a search query including search terms from the user initiating a search session;
    determine search results, including at least one snippet from a snippet database, based on the search query;
    determine, by cognitive computing, a projected purpose of the user for initiating the search query based on information about the user from the user database;
    determine, by cognitive computing, a projected purpose of a creator of the at least one snippet based on calendar data of the creator;
    determine a match score for the at least one snippet indicating a relevancy of the at least one snippet to the user initiating the search query based on a comparison of the projected purpose of the user and the projected purpose of the creator of the at least one snippet;
    present the search results with the at least one snippet to the user based on the match score for the at least one snippet;
    receive an indication of content of value from at least one user, wherein the content of value is content from the search results;
    generate a new snippet based on the indication of content of value, wherein the new snippet is tagged with context data including the search terms and creator identification metadata for the at least one user; and
    save the new snippet in the snippet database.

11. The computer program product of claim 10, wherein the program instructions further cause the computing device to present the at least one snippet to the user in order of relevance to the user based on the match score.

12. The computer program product of claim 11, wherein the at least one snippet is presented to the user with the match score, and the match score is further based on similarity of interests between the user and a creator of the at least one snippet, wherein the interests are determined from the user database.

13. The computer program product of claim 11, wherein the program instructions further cause the computing device to:
    receive user interaction data indicating interactions of the user with the search results; and
    change the presentation of the at least one snippet to the user based on the user interaction data.

14. The computer program product of claim 10, wherein the new snippet is further tagged with metadata indicating that the user has applied an indicator of the user's emotions to the new snippet.

15. A system, comprising:
a processor, a computer readable memory and a computer readable storage medium associated with a computing device;
program instructions to monitor search results from multiple participants in a social network to determine most used search results of the multiple participants based on similar search queries;
program instructions to generate one or more collaborative snippets based on the most used search results of the multiple participants, wherein the one or more collaborative snippets comprise a small region of reusable source code, machine code or text created from content of the most used search results and enabling visualization of the content;
program instructions to automatically tag the one or more collaborative snippets with context data tags including creator identification metadata identifying more than one participant associated with the generation of each of the one or more collaborative snippets;
program instructions to save the one or more collaborative snippets in a snippet database of the social network;
program instructions to determine content of value to a user by analyzing image data of the user to determine content the user focuses on using eye tracking techniques; and
program instructions to modify the one or more collaborative snippets based on the determined content of value to the user, wherein the program instructions are stored on the computer readable storage medium for execution by the processor via the computer readable memory.

16. The system of claim 15, wherein the context data tags further comprise search terms associated with the content of the most used search results, and a source of the content.

17. The system of claim 15, further comprising:
program instructions determine new search results, including a select collaborative snippet from the one or more collaborative snippets in the snippet database, based on a search query received at the computing device from a user; and
program instructions to present the new search results with the select collaborative snippet to the user.

18. The system of claim 17, further comprising:
program instructions to receive and store user profile data for multiple participants in a user database;
program instructions to identify creators of the select collaborative snippet based on the creator identification metadata of the select collaborative snippet; and
program instructions to determine a match score for the select collaborative snippet indicating a relevancy of the select collaborative snippet to the user based on the creators of the select collaborative snippet and a comparison of user profile data of the user in the user database and user profile data of the creators of the select collaborative snippet in the user database.

19. The system of claim 18, wherein the match score is based on a comparison of a work group of the user with work groups of the creators of the select collaborative snippet.

20. The system of claim 18, wherein the select collaborative snippet is presented to the user with a visual indication of the relevancy of the select collaborative snippet to the user based on the match score.

* * * * *